United States Patent [19]

Takada

[11] 4,258,933
[45] Mar. 31, 1981

[54] MOVABLE INBOARD BELT GUIDE FOR USE IN PASSIVE VEHICLE OCCUPANT RESTRAINT SYSTEMS

[76] Inventor: Juichiro Takada, 3-12-1, Shinmachi, Setagayaku, Tokyo, Japan

[21] Appl. No.: 47,380

[22] Filed: Jun. 11, 1979

[30] Foreign Application Priority Data

Dec. 25, 1978 [JP] Japan ............................ 53-175998[U]
Dec. 25, 1978 [JP] Japan ............................ 53-175999[U]

[51] Int. Cl.³ .......................................... B60R 21/08
[52] U.S. Cl. .................................. 280/804; 280/808; 297/469
[58] Field of Search ............... 280/802, 803, 804, 808; 297/469, 473

[56] References Cited

U.S. PATENT DOCUMENTS

| 3,810,657 | 5/1974 | Campbell | 280/808 |
| 3,833,239 | 9/1974 | Coenen | 280/803 |
| 4,084,841 | 4/1978 | Hayashi | 280/802 |

*Primary Examiner*—John P. Silverstrim
*Attorney, Agent, or Firm*—Brumbaugh, Graves, Donohue & Raymond

[57] ABSTRACT

A passive vehicle occupant restraint system for use with a vehicle seat which has a foldable back includes an inboard movable belt guide through which a portion of the belt intermediate an inboard and an outboard portion freely passes. The belt guide includes a guide member having a ring portion receiving the belt and mounted on the inboard side of the seat for generally backward and forward movement of the ring portion. A drive device is coupled between the belt guide member and an element associated with the back of the seat such that the belt guide ring portion is moved forwardly in response to forward folding of the seat back and is moved rearwardly in response to restoration of the seat back to the normal upright position.

7 Claims, 6 Drawing Figures

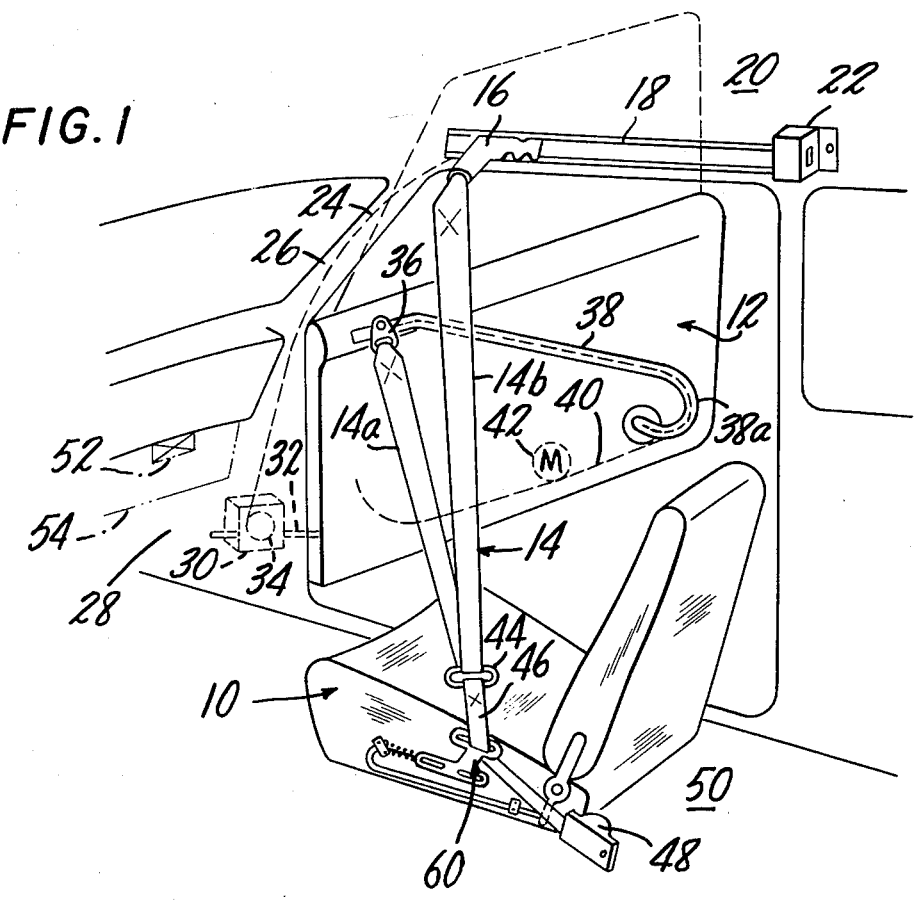
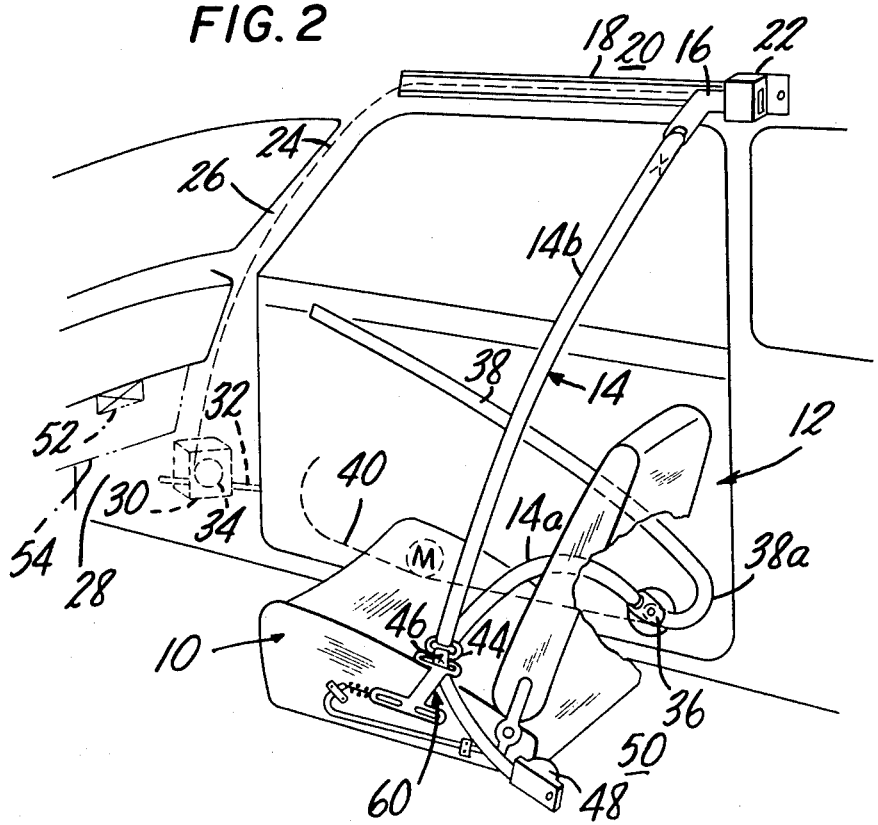

MOVABLE INBOARD BELT GUIDE FOR USE IN PASSIVE VEHICLE OCCUPANT RESTRAINT SYSTEMS

FIELD OF THE INVENTION

This invention relates to passive vehicle occupant restraint systems and, in particular, to a movable inboard belt guide for use with a passive restraint system associated with a seat having a forwardly foldable seat back, such as the type of seat usually provided in two door automobiles which have rear seats.

BACKGROUND OF THE INVENTION

A variety of passive vehcile occupant restraint belt systems have heretofore been proposed in which the outboard end of a restraint belt is moved forward away from the occupant when the door is opened and is moved rearwardly to a restraint configuration when the door is closed. For example, some proposed systems include a lap belt which leads from an inboard location adjcent the lower rear portion of the vehicle seat across the seat to a movable guide which slides along a guide rail on the inside of the door between an occupant-restraining location near the lower rear corner of the door and an occupant-releasing location near the window sill somewhere between the forward and rearward ends of the door. Other systems comprise a shoulder belt which leads from an inboard location adjacent the lower rear portion of the seat up to a movable guide that moves along a guide rail at the edge of the roof above the vehicle door. Other systems employ both the lap belt and the seat belt. In still another type of passive restraint belt system, often called a three-point system, the ends of a shoulder belt and a lap belt that are located on the inboard side of the seat occupant when the belts are in the occupant-restraining configuration are joined to each other and to a control ring at the end of a control belt which leads from an emergency locking retractor adjacent the lower rear portion of the inboard side of the seat.

In almost all passive vehicle occupant restraint belt systems of the types referred to above, there is a fixed location at the inboard lower rear portion of the seat from which a control belt, lap belt or shoulder belt leads. When any of these systems are used in association with a seat having a back which folds forwardly, the best example of which is the front seat of a two door automobile having a rear seat, the lap belt, shoulder belt or control belt interfers with the forward folding of the seat, even when the belt is in the releasing configuration. When the door is open and the passive belt is in the releasing configuration and a passenger in the rear seat pushes the seat back of the front seat forwardly, the seat back will contact the front seat restraint belt or control belt, especially the inboard part. Ordinarily, an additional length of the belt will be drawn from a retractor so that the seat back can be pushed further forward, but the result of such contact and movement is a wearing action on both the belt and the part of the seat back which contacts the belt. Moreover, additional forces are required to be exerted by the rear seat passenger to push the seat back forward so he can enter or leave the vehicle.

Another problem with passive restraint belt systems used in connection with seats having forwardly folding backs is that it sometimes happens that the seat back is folded forwardly when someone tries to open or close the door. In some three-point systems, the control ring sometimes catches on the seat back and jams the mechanism which moves the belts and prevents the door from being opened or closed as long as the control ring is caught.

SUMMARY OF THE INVENTION

There is provided, in accordance with the present invention, an improvement in passive vehicle occupant restraint systems for use with vehicle seats having foldable backs which overcomes the difficulties and disadvantages of presently known systems, including not only those described above but others as well. The invention can be used in connection with a variety of restraint systems, such as systems having both a lap and shoulder belt, systems comprising a lap belt and an air bag and systems comprising a shoulder belt and an energy-absorbing knee bolster.

The invention is an inboard movable belt guide system which comprises a belt guide member having a ring portion through which a portion of the belt intermediate the inboard and outboard portions is freely movable. The belt guide member is mounted on the inboard side of the seat for generally forward and backward movement of the ring portion. A drive device is coupled between the belt guide member and some component associated with the back of the seat for moving the belt guide ring portion forwardly in response to forward folding of the seat back and for moving the ring portion rearwardly in response to restoration of the seat back to the normal upright position. The belt guide member may be mounted to slide forwardly and backwardly on the seat or it can be mounted to pivot about a pivot axis located some distance below the ring portion.

In one embodiment the belt guide member includes the plate-like slider portion having at least two elongated slots which are aligned substantially lengthwise of the vehicle. Each of the slots receives a guide pin, which may be the shank of a bolt, affixed to the side of the seat. A stem portion extends generally upwardly from the slider portion and carries the ring portion at the upper end thereof at a location generally at the level of the seat portion of the seat. The drive device is prefereably some form of motion transmitter which transmits motion of an element associated with the seat back at a location some distance from the pivot axis of the seat back to the movable guide member. For example, a suitable drive device is a wire connected at one end to the front of the guide member and having a portion that leads forwardly for a short distance at least equal to the distance along which the guide member moves and a second portion that loops and then leads rearwardly. The other end of the wire is coupled to a bracket that pivots with the seat back at a location that is spaced-apart from the pivot axis of the seat back. Preferably, the wire is sheathed along the loop and rearwardly leading portions, and the drive device includes a compression spring engaged between the front end of the guide member and an abutment on the seat forwardly of the guide member. The wire pulls the guide member forwardly when the seat back is folded forward, and the spring pushes the guide member back when the seat back is returned to the upright position.

In another embodiment of the invention the guide member is pivotably attached to the side of the seat and includes a stem portion that extends upwardly from the pivot axis and has the ring portion at the upper end thereof generally at the level of the seat. The drive device is a rigid link which is pivotably connected between the stem portion of the guide member and an element that pivots with the seat back located some distance above the pivot axis of the seat back. Conveniently, the rearward end of the link is connected to a bracket at the inboard side of the seat back by which the seat back is connected to the seat frame.

An important advantage of the invention is, of course, the reduction or elminination of interference between a belt of a passive occupant restraint system and the seat back of a folding seat when the seat back is folded forward by moving the inboard part of the belt forwardly. The extent to which the seat back can be folded forward without contacting the belt is considerably increased and indeed can, in any particular design, be completely eliminated. As a result of reducing or eliminating interference between the belt and the seat back, the mutual abraison of the seat and the back due to interference is also eliminated. Accordingly the life of the belt is increased. It is also easier to push the seat back fully forward, and possible problems with jamming of the belt transfer system when the seat back is folded forward are virtually eliminated.

For a better understanding of the invention reference may be made to the following description of exemplary embodiments, taken in conjunction with the figures of the accompanying drawings.

DESCRIPTION OF THE DRAWINGS

FIG. 1 is a pictorial view in schematic form of an exemplary passive belt system which includes one embodiment of the present invention; the restraint system is shown in the occupant-releasing configuration with the door open;

FIG. 2 is a pictorial view similar to FIG. 1 except that it shows the restraint system in the occupant-restraining configuration;

DESCRIPTION OF THE EXEMPLARY EMBODIMENT

Figure 3:
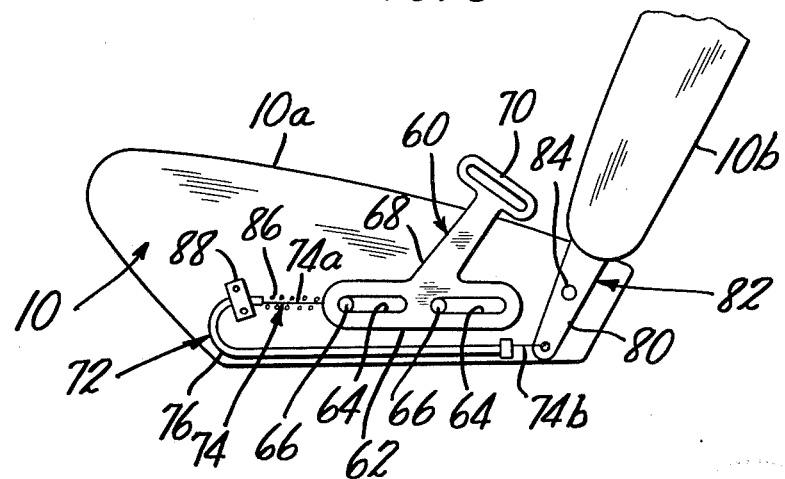
FIG. 3 is a side elevational view of the embodiment of inboard belt transfer system shown in FIGS. 1 and 2, the system being shown with the seat back upright.

The passive vehicle occupant restraint system shown in FIGS. 1 and 2 is of the type often called a three-point system. It is shown in FIGS. 1 and 2 in conjunction with the right front passenger seat 10 and makes use of the opening and closing motions of the vehicle door 12 to move a lap belt portion 14a and a shoulder belt porton 14b of a continuous restraint belt 14 between an occupant-releasing configuration (FIG. 1) and an occupant-restraining configuration (FIG. 2). The upper outboard end of the shoulder belt portion 14b of the restraint belt 14 is connected to a movable anchor 16 that slides along a guide rail 18 mounted at the edge of the vehicle roof 20 above the door 12. The movable anchor 16 is selectively lockable by means of a locking device associated with a fixed anchor 22 mounted at the rear end of the track 18, the locking device being either a mechanical latching type which locks automatically when the movable anchor 16 moves to the restraint location or an inertia responsive locking mechanism which responds to an abrupt change in the velocity of the vehicle. The present inventor has disclosed a number of such systems in U.S. Patent Application Ser. No. 44196, filed May 31, 1979 and entitled LOCKABLE MOVING BELT ANCHOR FOR PASSIVE VEHICLE OCCUPANT RESTRAINT BELT SYSTEMS, and reference may be made to that application for complete description and drawings of suitable lockable movable anchors.

The movable anchor 16 is connected to a drive wire 24 which is trained down along the front post 26 of the vehicle body 28 to a mechanical motion amplifier 30. The motion amplifier is installed in the vehicle body 28 just forward of the front end of the door and includes a linkage 32 which transmits relative motion of the door to an input component of the amplifier 30. The motion amplifier amplifies door opening and closing motions and drives an output reel 34 which is coupled to the drive wire 26. When the door is moved from closed toward open the door motion is transmitted by the linkage 32 to the amplifier which amplifies that motion and drives the output reel in a direction to move the wire 26 up so that it pushes the movable anchor 16 rearwardly along the track until the anchor 16 automatically engages and locks or is in condition to be inertially locked to the fixed anchor 22. When the door is moved from closed toward open, the drive wire 26 is moved in the opposite direction and pulls the movable anchor 16 forwardly to the releasing configuration (see FIG. 1). Reference may be made to the present inventor's application Ser. No. 950,020, filed Oct. 10, 1978, for PASSIVE VEHICLE OCCUPANT RESTRAINT BELT SYSTEM for a full description and illustration of a suitable linkage and motion amplifier system.

The lap belt portion 14a of the continuous belt 14 is connected at its outboard end to a movable anchor 36 which moves along a guide rail 38 mounted on the inside of the door. The anchor 36 is coupled to a drive wire 40 which, in turn, is driven by a gear-reduced motor 42. The control circuit of the motor preferably provides for energizing the motor to drive the wire in a direction to move the anchor to the releasing location at the upper forward end of the track when the door is opened and for energizing of the motor in the reverse direction so that the wire 40 pulls the anchor 36 back to the restraint location when the door is closed. The guide rail 38 is generally J-shaped in that it includes a rearward portion 38a which curves downwardly and then forwardly. The lower forward end of the portion 38a is the restraint location, and any pulling force on the lap belt portion 14a seats the anchor 36a firmly at the lower forward end of the portion 38a. The guide rail 38 leads from the lower rearward curved portion 38a generally diagonally along the door to the position near the front end of the window sill, such forward location being the release location of the anchor 36.

An intermediate portion of the continuous restraint belt 14 between the lap and shoulder belt portions passes through a control ring 44 which is secured to one end of a control belt 46. The other end of a control belt 46 is wound onto an emergency locking retractor 48 which is attached to the vehicle floor 50 at a location adjacent the lower rearward inboard portion of the seat 10—it can also be attached directly to the seat. When the door is opened, a length of the control belt 46 is pulled from the emergency locking retractor 48, such length of belt being an amount required to permit the continuous belt to move forwardly and outwardly when the outboard ends move to the releasing locations (FIG. 1). When the door is closed, the retractor 48 rewinds the length of belt of control belt 46 and pulls the ring 44 into a position generally to the rear on the inboard side of the seat 10 (FIG. 2), thereby pulling the belts into comfortable engagement with the occupant. Meanwhile the closing of the door has brought the restraint belt back to the restraint configuration with the outboard anchors at the restraint locations, as shown in FIG. 2.

The passive restraint belt system in FIG. 1 and 2 is merely exemplary of various restraint systems in which the present invention may be used. For example, the invention can be used with a lap belt and an inflatable air bag 52 (shown in phantom lines in drawings to indicate that it is an alternative optional component). Similarly, the restraint system with which the invention is used may comprise a shoulder belt and an energy-absorbing knee bolster 54.

Figure 4:
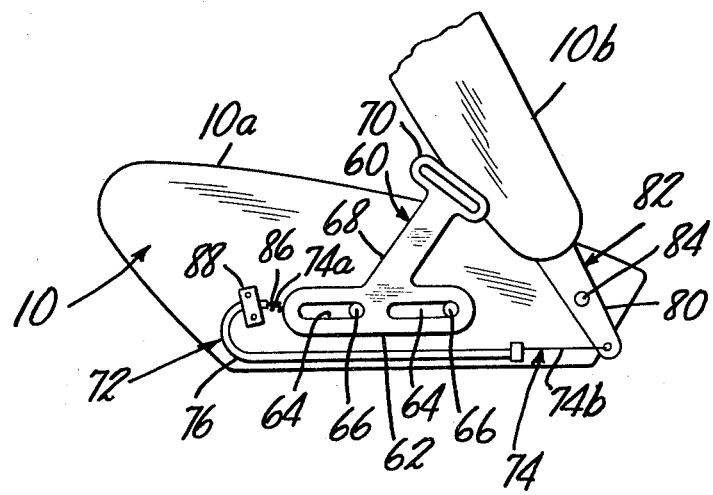
FIG. 4 is a side elevational view similar to FIG. 3 but showing the movable belt guide moved forward in response to forward folding of the seat back.

As shown generally in FIGS. 1 and 2 and in detail in FIGS. 3 and 4, one embodiment of the inboard movable belt guide system comprises a belt guide member 60 in the form of a generally H-shaped plate which includes a slider portion 62 at the lower end having a pair of lengthwise elongated slots 64, each of which receives a guide pin 66 that is affixed to the side of the seat portion 10a of vehicle seat 10. A stem portion 68 of the guide member 60 extends up from the slider portion and carries a belt guide ring 70 at the upper end, the guide ring 70 being generally at the same level as the rearward portion of the upper surface of the seat portion 10a of the vehicle seat. A drive device is coupled between the movable guide member 60 and a component associated with the foldable seat back portion 10b of the seat 10. In particular, the drive device 72 in the embodiment of FIGS. 1 to 4 is a wire 74 which is connected at one end to the front of the belt guide member 60 and includes a portion 74a which leads forwardly and is of a length somewhat greater than the distance along which the belt guide member 60 moves forwardly from its rearwardmost position. Over part of its length the wire 74 is received within a sheath 76, which part includes a second portion 74b which curves downwardly and then rearwardly. The other end of the wire 74 is fastened to a downwardly dependent extension 80 of an end bracket 82 which supports the seat back 10b for forward folding motion about a pivot axis 84. The extension 80 of the bracket below the pivot axis 84 provides for attachment of the rearward end of the transfer wire 74 at a point some distance from the pivot axis so that folding motion of the seat back 10b produces motion of the wire attachment point.

When the seat back 10b is folded forward, the wire attachment point on the extension 80 moves rearwardly and pulls the wire 74 in a direction which pulls the movable guide member 60 forward along the side of the seat. The ring portion 70 shifts the control belt 46 and, therefore, the restraint belt 14 forward to positions which provide ample room for the seat back 10b to be folded forward without contacting the belt or the control ring 44. The forward shifting of the belts ensures maximum convenience to an occupant who is to enter or leave the rear seat of the vehicle and eliminates the wear problem and the other difficulties previously described of the presently known systems.

When the seat back 10b is again restored to its upright position, the lower portion 80 of the bracket 82 moves forward, slackening the wire. A spring 86 compressed between the forward end of the slider portion 62 of the movable guide member 60 and an abutment 88 which is affixed to the side of the seat a distance in front of the front edge of the movable guide member 68 which is somewhat greater than the distance along which the guide member moves pushes the belt guide back to the rearward location on the seat.

Figure 5:
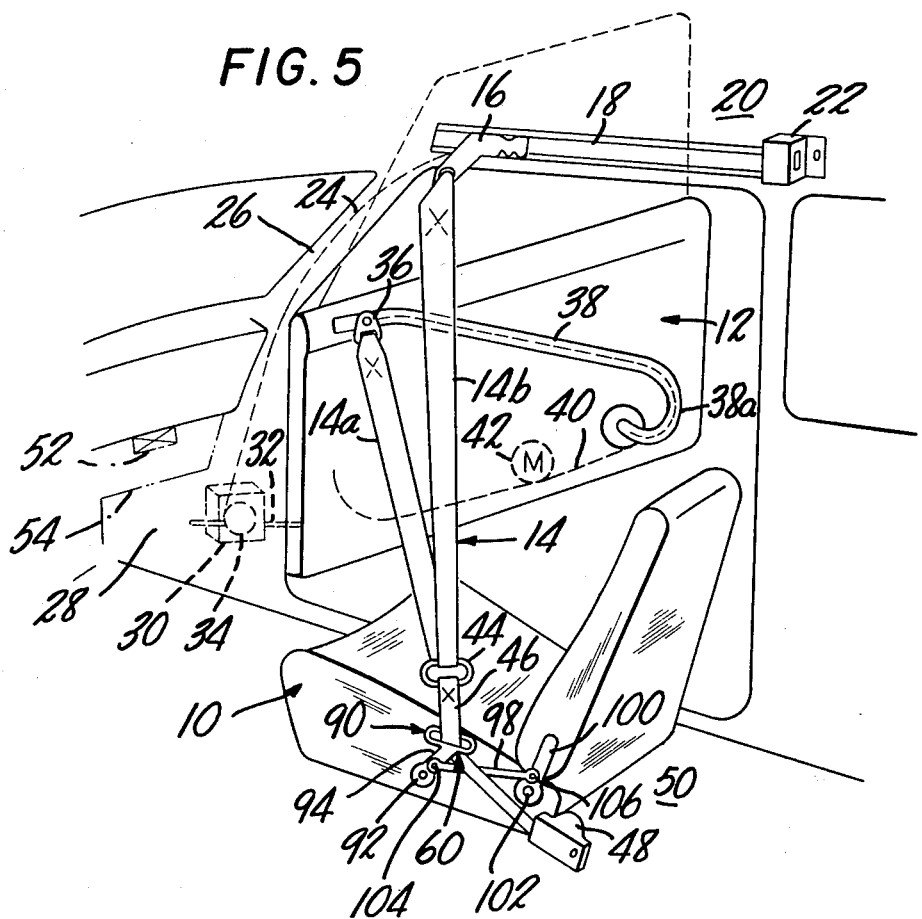
FIG. 5 is a pictorial view in schematic form of a restraint system substantially identical to that shown in FIGS. 1 and 2 but employing another embodiment of inboard movable belt guide system.
Figure 6:
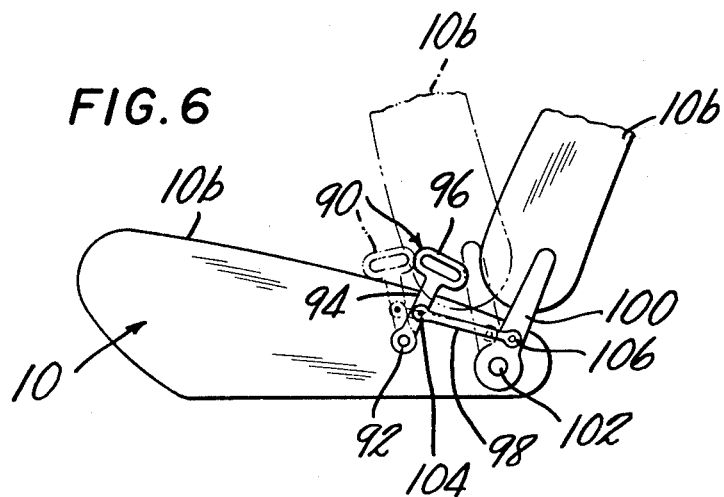
FIG. 6 is a side elevational view of the inboard movable belt guide system employed in the restraint system shown in FIG. 5.

The embodiment of the invention shown in FIGS. 5 and 6 is identical to that shown in FIGS. 1 to 4 except for a different movable inboard belt guide. Accordingly, the same reference numerals are applied to components of the belt system shown in FIG. 5 as are used in FIGS. 1 and 2.

The movable inboard belt guide in the system of FIGS. 5 and 6 comprises a movable belt guide member 90 which is fastened to the inboard side of the seat by a pivot bolt 92 and includes a supporting arm portion 94 having a guide ring portion 96 at its upper end through which the control belt 46 leads. The movable guide member 90 is coupled by a link 98 to a bracket 100 on which the seat back 10b is mounted, the bracket 100 being pivoted on a pivot bolt 102 so that the seat back can fold forwardly by pivoting about the axis of the pivot bolt 102. The link 98 is pivotably attached to the belt guide member 90 and the bracket 100 at pivot points 104 and 106 located some distance above the pivot bolts 92 and 102, respectively. In the upright position, as shown in solid lines in FIG. 6, the belt guide ring 96 is located in a rearward position where it holds the control belt 46 and the restraint 14 in a configuration for safe and comfortable fitting of the restraint belt to the occupant when the belt is in the restraint configuration (see FIG. 2). When the seat is folded forward, the motion of the pivot point 106 is transmitted by the link 98 to the pivot point 104, thereby pivoting the movable guide member 90 forwardly about the pivot bolt 92 and ultimately attaining the forward position (shown in phantom lines in FIG. 6) in which the guide ring portion 96 retains the inboard portions of the control belt 46 and the restrint belt 14 in a forward position where they do not interfere with forward folding of the seat. It is apparent, therefore, that the link 98 transmits forward and backward movements of the ring portions 96 of the movable belt guide 90 which correspond to forward and rearward movements of the seat back 10b.

The above-described embodiments of the invention are merely exemplary and numerous variations and modifications will be readily apparent to those skilled in the art without departing from the spirit and scope of the invention. All such variations and modifications are intended to be included within the scope of the invention as defined in the appended claims.

I claim:

1. In a passive vehicle occupant restraint system for a vehicle seat having a foldable back, the system including a belt leading from an inboard location adjacent the lower rear portion of the seat, the improvement of an inboard movable belt guide comprising a belt guide member having a ring portion through which the belt is freely movable, means mounting the belt guide member on the inboard side of the seat for generally forward and backward movement of the ring portion, and drive means coupled between the belt guide member and an element associated with the back of the seat for moving the belt guide ring portion forwardly in response to forward folding of the seat back and for moving the ring portion rearwardly in response to restoration of the seat back to the normal upright position.

2. The improvement according to claim 1 in which the mounting means includes means slidably carrying the belt guide member.

3. The improvement according to claim 2 in which the belt guide member includes a plate-like slider portion having at least two elongated slots aligned substantially lengthwise of the vehicle, and said slidably carrying means includes a pair of guide pins affixed to the seat, one of which is received in each of the slots.

4. The improvement according to claim 3 in which the belt guide member also includes a stem portion extending generally upwardly from the slider portion and carrying the ring portion at the upper end thereof at generally the level of the rear part of the seat portion of the seat.

5. The improvement according to any one of claims 1 to 4 in which the drive means comprises a wire connected at one end to the front of the guide member and having a portion leading forwardly from that end and a portion that loops and then leads rearwardly and is coupled at the other end to a bracket that pivots with the seat back at a location on the bracket spaced apart from the pivot axis of the seat back.

6. The improvement according to claim 5 in which the wire is sheathed along the looped and rearwardly leading portion, and the drive means further includes a compression spring engaged between the front end of the guide member and an abutment on the seat forwardly of the guide member, whereby the wire pulls the guide member forwardly when the seat back is folded forward and the spring pushes the guide member back when the seat back is returned to the normal upright position.

7. The improvement according to claim 1 in which the mounting means includes means pivotably mounting the guide member on the side of the seat about a pivot axis, wherein the guide member includes a stem portion extending upwardly from the pivot axis of the guide member and having the ring portion at the upper end thereof generally at the level of the rear part of the seat portion, and wherein the drive means is a rigid link pivotably connected between the stem portion of the guide member and an element that pivots with the seat back located above the pivot axis of the seat back.

* * * * *